United States Patent
Cardells et al.

(10) Patent No.: US 9,041,978 B2
(45) Date of Patent: May 26, 2015

(54) SELECTING PRINTING MASKS OPTIMIZED FOR LINE FEATURES AND AREA FILL FEATURES OF IMAGE DATA

(75) Inventors: Ana Maria Cardells, Barcelona (ES); Angel Martinez, Barcelona (ES); Steven W. Steinfield, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1686 days.

(21) Appl. No.: 12/239,997

(22) Filed: Sep. 29, 2008

(65) Prior Publication Data

US 2009/0135217 A1 May 28, 2009

Related U.S. Application Data

(60) Provisional application No. 60/989,927, filed on Nov. 24, 2007.

(51) Int. Cl.
  *H04N 1/40* (2006.01)
  *H04N 1/50* (2006.01)
  *G06K 15/02* (2006.01)
  *G06K 15/10* (2006.01)

(52) U.S. Cl.
  CPC .................................. *G06K 15/102* (2013.01)

(58) Field of Classification Search
  None
  See application file for complete search history.

(56) References Cited

U.S. PATENT DOCUMENTS

| | | | |
|---|---|---|---|
| 5,483,625 A | 1/1996 | Robertson et al. | |
| 5,563,985 A | 10/1996 | Klassen et al. | |
| 5,602,572 A * | 2/1997 | Rylander | 358/3.09 |
| 5,706,414 A * | 1/1998 | Pritchard | 358/1.18 |
| 5,781,713 A | 7/1998 | Yamada | |
| 5,992,962 A | 11/1999 | Yen et al. | |
| 6,091,454 A | 7/2000 | Richter | |
| 6,341,020 B1 | 1/2002 | Rumph et al. | |
| 6,454,389 B1 | 9/2002 | Couwenhoven et al. | |
| 6,542,258 B1 * | 4/2003 | Garcia et al. | 358/1.9 |
| 2002/0149578 A1 * | 10/2002 | Atkins | 345/418 |
| 2005/0052493 A1 * | 3/2005 | Van Doorn et al. | 347/41 |
| 2006/0033772 A1 * | 2/2006 | Yakubov et al. | 347/41 |
| 2006/0109291 A1 * | 5/2006 | De Pena et al. | 347/12 |
| 2007/0153046 A1 * | 7/2007 | Kanematsu et al. | 347/19 |
| 2007/0242096 A1 * | 10/2007 | Baba et al. | 347/19 |
| 2008/0036811 A1 * | 2/2008 | Heydinger | 347/15 |

* cited by examiner

Primary Examiner — Scott A Rogers
(74) Attorney, Agent, or Firm — Michael A. Dryja

(57) ABSTRACT

For each totally black pixel of image data to be printed using a fluid-ejection printing device, it is determined whether the pixel is part of a line feature or an area fill feature of the image data. Where the pixel is part of a line feature, a first printing mask selected that is optimized for printing line features. Where the pixel is part of an area fill feature, a second printing mask is selected that is optimized for printing area fill features. Each mask specifies a number of fluid droplets to be printed and positions where the fluid droplets are to be printed. The selected mask is applied to the pixel. The pixel is printed using the mask that has been applied. The fluid-ejection printing device prints the pixel by ejecting the number of fluid droplets specified by the mask at the positions specified by the mask.

20 Claims, 4 Drawing Sheets

SELECTING PRINTING MASKS OPTIMIZED FOR LINE FEATURES AND AREA FILL FEATURES OF IMAGE DATA

RELATED APPLICATION

This application claims priority from U.S. Provisional Application Ser. No. 60/989,927 filed Nov. 24, 2007, which is hereby incorporated by reference in its entirety.

BACKGROUND

Fluid-ejection printing devices, such as inkjet-printing devices, are commonly used to print image data on media such as paper. The image data can include both lines, which can be referred to as line features, as well as solid regions, which can be referred to as area fill feature. This is especially the case for architectural engineering and construction (AEC)-related and mechanical computer-aided draft (CAD)-related image data.

Optimally printing both line features and area fill features within the same print mode of a fluid-ejection printing device has proven to be problematic, however. Bidirectional print modes in particular, in which a printing device prints on media in both directions that a printhead of the printing device is moved past the media, have difficulty optimally printing both line features and area fill features. Line features are desired to be printed so that the lines in question are well defined and have a minimal width. By comparison, area fill features are desired to be printed so that the solid regions in question have maximal black optical density (KOD).

However, printing line features so that the lines in question are well defined and have a minimal width usually means sacrificing black optical density of area fill features that are also printed. Likewise, printing area fill features so that the solid regions in question have maximal black optical density usually means sacrificing definition and the minimal width of line features that are also printed. While printing using unidirectional print modes ameliorates these difficulties to some extent, this solution is drastic in that it reduces throughput by approximately half.

DETAILED DESCRIPTION OF THE DRAWINGS

Figure 1:
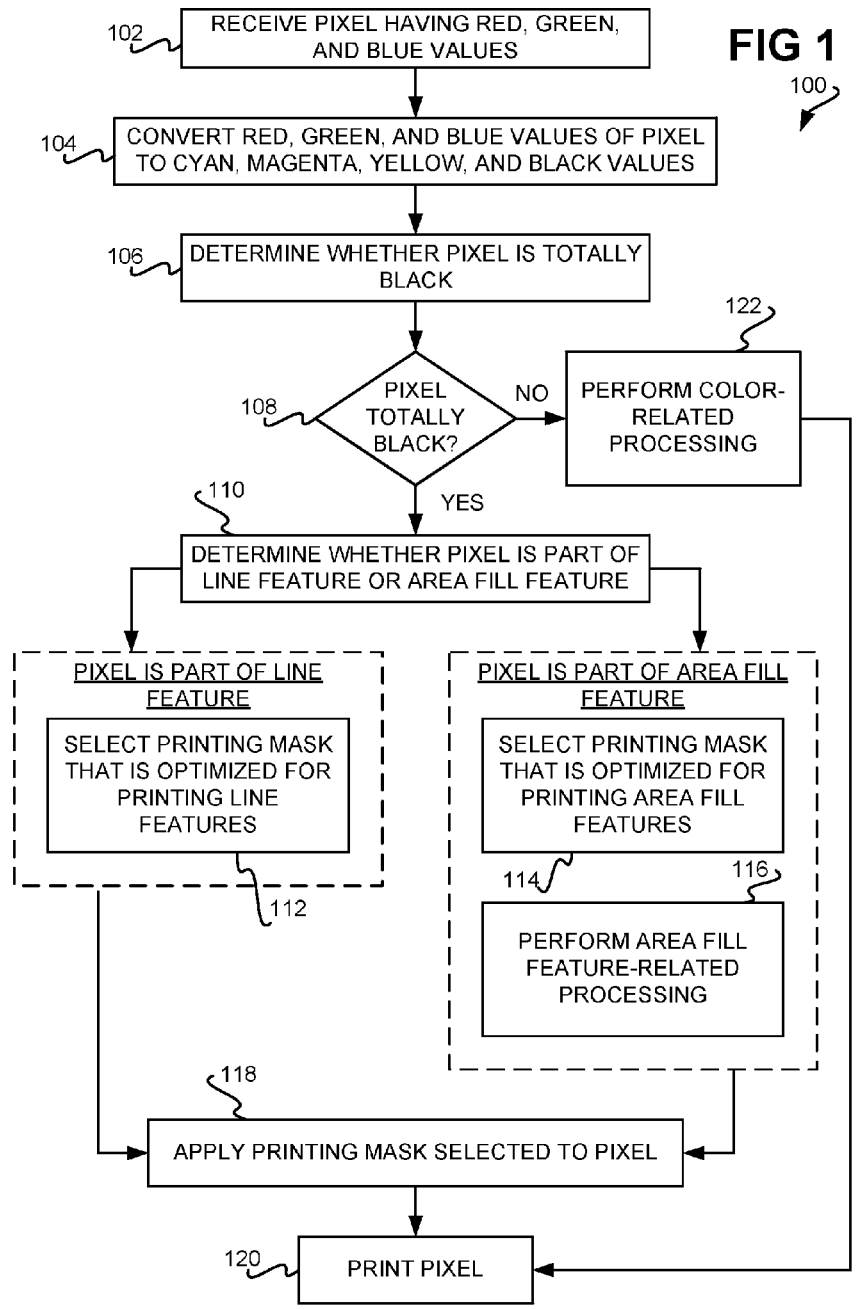
FIG. 1 is a flowchart of a method for optimally printing both line features and area fill features of image data using a fluid-ejection printing device, according to an embodiment of the present disclosure.

FIG. 1 shows a method 100 for optimally printing both line features and area fill features of image data using a fluid-ejection printing device, according to an embodiment of the invention. The method 100 may be implemented as one or more computer programs stored on a computer-readable medium, such as a recordable data storage medium. The computer-readable medium may be inserted into or may be a part of the fluid-ejection printing device itself, such that the computer programs are executed by the printing device. Alternatively, the computer-readable medium may be inserted into or may be a part of a host computing device to which the fluid-ejecting printing device is communicatively connected, such that the computer programs are executed by the host computing device.

The method 100 is performed in relation to each pixel of a number of pixels of image data. However, the method 100 is described in relation to just a single pixel for descriptive clarity and convenience. The method 100 can be performed in relation to a single print mode of the fluid-ejection printing device. That is, the method 100 does not require the user to switch between two or more different print modes of the printing device, and otherwise does not require switching between two or more different print modes of the printing device. For example, the fluid-ejection printing device may have both a unidirectional print mode and a bidirectional print mode.

In a unidirectional print mode, a printhead of the printing device prints just when it is moving in a given direction past the media in question, such as a sheet of paper. For example, the printhead may print just when it moves from left to right, and not when it moves from right to left. By comparison, in a bidirectional print mode, a printhead of the printing device prints when it is moving in either direction past the media. For example, the printhead may print both when it moves from left to right, as well as when it moves from right to left. Thus, the method 100 can optimally print both line features and area fill features of image data in a single print mode. For example, the method 100 can optimally print both line features and area fill features in a bidirectional print mode, without having to ever switch to a unidirectional print mode.

Figure 2:
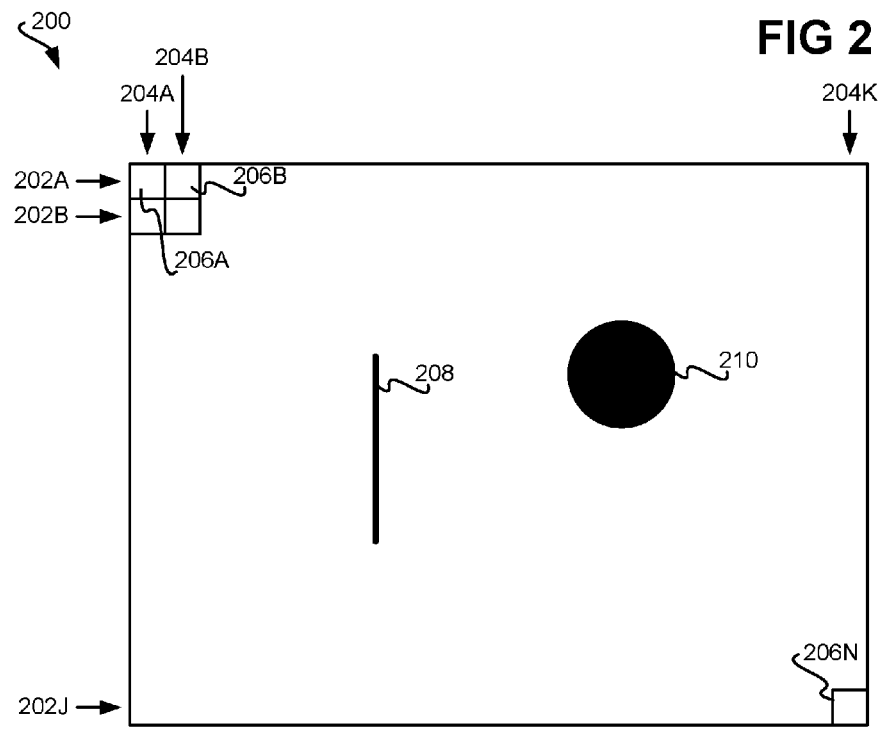
FIG. 2 is a diagram of representative image data, in relation which embodiments of the present disclosure can be performed.

FIG. 2 shows representative image data 200 in relation to which embodiments of the present disclosure, such as the method 100, may be performed. The image data 200 includes a number of pixels 206A, 206B, . . . , 206N, collectively referred to as the pixels 206, organized along a number of rows 202A, 202B, . . . 202J, collectively referred to as the rows 202, and a number of columns 204A, 204B, . . . , 204K, collectively referred to as the columns 204. While there are more columns 204 than rows 202 in FIG. 2, the opposite may also be true. Furthermore, while the pixels 206 of the image data 200 are organized in a rectangular grid in FIG. 2, they may be organized in other types of configurations as well.

The image data 200 is depicted in FIG. 2 as specifically including a line feature 208 and an area fill feature 210. The line feature 208 defines a line, which itself may be defined as more than one contiguous pixel having the same color and organized along a row, along a column, or diagonally, that is no more than a minimum number of pixels in thickness, such as one pixel in thickness. The area fill feature 210 defines a solid region, which itself may be defined as more than one contiguous pixel having the same color but that does not define a line.

Referring now to the method 100 of FIG. 1, a pixel is received that has red, green, and blue values (102). The red, green, and blue values of the pixel define the color of the pixel. Thus, the method 100 may be performed in relation to full-color image data in one embodiment. The red, green, and blue values of the pixel are converted to cyan, magenta, yellow, and black values for the pixel (104), as can be appreciated by those of ordinary skill within the art. That is, the pixel is converted from the red, green, blue (RGB) color space to the cyan, magenta, yellow, black (CMYK) color space.

Figure 3:
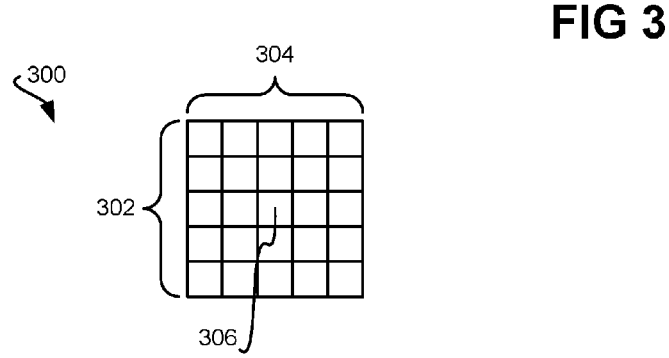
FIG. 3 is a diagram of a matrix that can be used to determine whether a pixel is part of a line feature or is part of an area fill feature, according to an embodiment of the present disclosure.

The method 100 next determines whether the pixel is totally black (106). In one embodiment, determining whether the pixel is totally black is performed by determining whether the pixel has the maximum allowable black value, and the minimum allowable cyan, magenta, and yellow values. For example, in an eight-bit color space, a totally black pixel has values of zero, zero, zero, and $2^8-1=255$ as its cyan, magenta, yellow, and black color values, respectively.

Where the pixel is totally black (108), then the method 100 determines whether the pixel is part of a line feature or part of an area fill feature (110). FIG. 3 shows a matrix 300 that may be employed to determine whether the pixel is part of a line feature or part of an area fill feature, according to an embodiment of the present disclosure. The matrix 300 includes positions organized over a number of rows 302 and a number of columns 304. The matrix 300 specifically includes a center position 306. The rows 302 may be equal in number to the columns 304. The number of rows 302 and the number of columns 304 are desirably odd. Thus, in the example of FIG. 3, the matrix 300 is a five position-by-five position grid.

The matrix 300 is effectively superimposed over a subset of the pixels of the image data such that the pixel in relation to which the method 100 is being performed occupies the center position 306. In one embodiment, if the pixels at all the other locations of the matrix 300 have cyan, magenta, yellow, and black values equal to those of the pixel at the center position 306, then it is concluded that the pixel at the center position 306 is part of an area fill feature. In this embodiment, if any pixel at any other location of the matrix 300 does not have cyan, magenta, yellow, and black values equal to those of the pixel at the center position 306, then it is concluded that the pixel at the center position 306 is part of a line feature.

Thus, in one embodiment, if the pixels at all the other locations of the matrix 300 are totally black pixel like the pixel at the center position 306, then it is concluded that the pixel at the center position 306 is part of an area fill feature. In this embodiment, if any pixel at any other location of the matrix 300 does not have a totally black pixel like the pixel at the center position 306, then it is concluded that the pixel at the center position 306 is part of a line feature. Those of ordinary skill within the art can appreciate that other approaches may be employed in relation to the matrix 300 to determine whether the pixel at the center position 306 is part of a line feature or an area fill feature.

Referring back to FIG. 1, where the pixel is part of a line feature, then a printing mask is selected that is optimized for printing line features (112). A printing mask can be generally defined as specifying at least the number of fluid droplets to be printed for a given pixel, as well as the positions where the fluid droplets are to be printed for the given pixel. For example, to print a given pixel, a number of fluid droplets may be printed at a given location on media, such as a sheet of paper. This given location may have a number of positions into which the location is divided. Thus, a printing mask specifies the number of fluid droplets to be printed—i.e., ejected—to print a given pixel, as well as the positions at which the fluid droplets are to be printed for the location in question. In this way, the size of the pixel may be greater than the size of the fluid droplets that the fluid-ejection printing device ejects to print the pixel.

The printing mask selected where the pixel is part of a line feature is specifically optimized for printing line features in that it may compensate for one or more of the following. First, although fluid droplets are idealized as spherical droplets of fluid, in actuality, these fluid droplets have shapes that are not perfectly spherical. For example, they may have a tear drop shape, with a primary part and a secondary, or tail, part. Indeed, in some situations, the tail part may break off from the primary part of a fluid droplet before the droplet impacts the media.

Second, the time differential between when a fluid droplet is ejected by the fluid-ejection printing device and when the fluid droplet impacts the media affects the shape of the fluid droplet as well. In particular, the form of the tail part of the fluid droplet when it impacts the media is a function of this time differential. The interaction between the tail part and the primary part of the fluid droplet during this time is caused by surface tension, differences in speed between the primary part and the tail part of the fluid droplet, as well as aerodynamic effects.

Third, bidirectional printing by the fluid-ejection printing device specifically in a bidirectional print mode can affect the shape of the fluid droplet. When printing is performed bidirectionally, the aerodynamic effects on the tail part of the fluid droplet relative to the primary part of the fluid droplet result in the shape of the fluid droplet when it impacts the media being a function of the direction of the movement of the printhead of the device. As such, fluid droplets ejected while the printhead is moving from left to right, for example, may appear differently than droplets ejected while the printhead is moving from right to left. Furthermore, because of the difference in directionality, the position of a droplet may be offset differently along the axis of printhead movement.

The printing mask selected in part 112 to optimize printing line features thus can compensate for these effects. Printing line features optimally can mean printing such features so that they have a minimal width, and that they are defined clearly. That is, the lines in question are straight, and do not waver back and forth across their lengths. When a printing mask is selected for a print mode in which a printhead of a fluid-ejection device prints a pixel over a number of passes in relation to a location on media at which the pixel is to be printed, the printing mask may further specify which of the fluid droplets, at which of the positions, are to be printed or ejected during each such pass.

Figure 4:
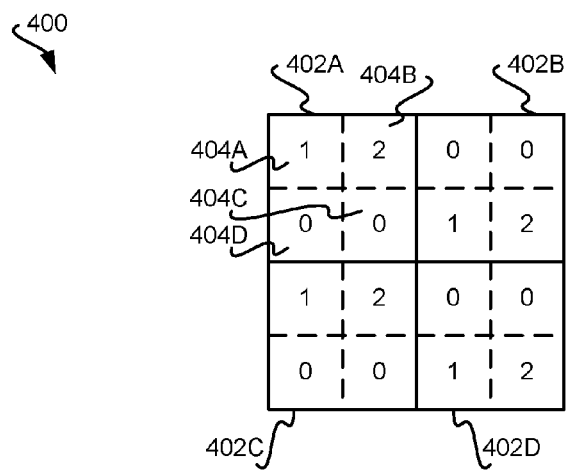
FIG. 4 is a diagram of a printing mask that can be used to optimally print a pixel that is part of a line feature, according to an embodiment of the present disclosure.

FIG. 4 shows a printing mask 400 to optimize printing line features, according to an embodiment of the invention. The printing mask 400 particularly includes four quadrants 402A, 402B, 402C, and 402D, collectively referred to as the quadrants 402. The quadrant 402A is first described as representative of each of the quadrants 402, and thereafter how the other quadrants 402B, 402C, and 402D can be employed in conjunction with the quadrant 402A is described.

It is noted that the quadrant 402A has a size corresponding to size of the pixel in question, such as $\frac{1}{600}$ of an inch in one embodiment. The quadrant 402A is itself divided into four quarters 404A, 404B, 404C, and 404D, collectively referred to as the quarters 404. Each of the quarters 404 has a size corresponding to the size of a fluid droplet that can be ejected by the fluid-ejection printing device in question, such as $\frac{1}{1,200}$ of an inch in embodiment. Thus, the quadrant 402A corresponds to a location on the media at which the pixel is to be printed, whereas the quarters 404 of the quadrant 402A correspond to the positions at or of this location at which fluid droplets can be ejected to realize the pixel.

The values of the quarters 404 within the quadrant 402A are interpreted as follows. A value of zero (0) means that no fluid droplet is to be ejected at the position in question of the quadrant 402A. A value of one (1) means that a fluid droplet is to be ejected at the position in question during a first pass by the printhead of the fluid-ejection printing device in relation to the quadrant 402A. A value of two (2) means that a fluid droplet is to be ejected at the position in question during a second pass by the printhead in relation to the quadrant 402A. Thus, the printing mask 400 is specifically for a print mode in which the printhead of the fluid-ejection printing device makes two (or more) passes over each location at which a pixel is to be printed. The quarters of the other quadrants 402B, 402C, and 402D are interpreted in a similar manner.

In one embodiment, the quadrants 402 of the printing mask 400 are together utilized as follows. When a first pixel of a given line feature is encountered via performance of the method 100, the upper-left quadrant 402A of the printing mask 400 is selected. When the second pixel of this same line feature is then encountered, then the upper-right quadrant 402B of the printing mask 400 is selected. Similarly, when the third pixel of this line feature is encountered, the lower-left quadrant 402C is selected, and when the fourth pixel of this line feature is encountered, the lower-right quadrant 402D is selected.

It is noted that the printing mask 400 is an inventive printing mask, in that the inventors constructed a number of different printing masks and empirically determined that the printing mask 400 of FIG. 4 optimizes line features. In particular, the printing mask 400 inventively minimizes or compensates for the three negative effects on fluid droplet shape that have been discussed above. In particular, the printing mask 400 of FIG. 4 has been found to optimize line features in a bidirectional, two-pass print mode.

Referring back to FIG. 1, where it is determined that the pixel is part of an area fill feature instead of being part of a line feature (110), then the method 100 selects a printing mask that is optimized for printing area fill features (114). Such a printing mask can also be generally defined as specifying at least the number of fluid droplets to be printed for a given pixel, as well as the positions where the fluid droplets are to be printed for the given pixel, as has been described above in relation to a printing mask for optimally printing line features. Likewise, the printing mask may further define which of the droplets are to be printed or ejected at which of the positions at each pass over the location at which the pixel is to be printed.

The printing mask selected where the pixel is part of area fill feature is specifically optimized for printing area fill features in that it may maximize black optical density (KOD) of a resultingly printed area fill feature. It is noted that it may seem intuitively obvious that black optical density is maximized by simply ejecting fluid droplets at all the positions of the location on the media at which the pixel is to be printed. However, this is actually not the case. Factors such as the type of paper, the type of fluid (e.g., ink), and other factors may militate against maximizing black optical density by simply ejecting fluid droplets at all the positions of the location in question.

Figure 5:
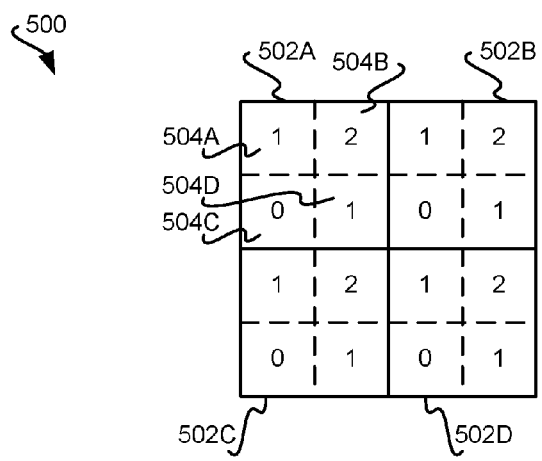
FIG. 5 is a diagram of a printing mask that can be used to optimally print a pixel that is part of an area fill feature, according to an embodiment of the present disclosure.

FIG. 5 shows a printing mask 500 to optimize printing area fill features, according to an embodiment of the invention. The printing mask 500 particularly includes four quadrants 502A, 502B, 502C, and 502C, collectively referred to as the quadrants 502. The quadrant 502A is described as representative of each of the quadrants 502. As with the printing mask 400 of FIG. 4, the quadrant 502A of the printing mask 500 has a size corresponding to a size of the pixel in question, and is divided into four quarters 504A, 504B, 504C, and 504D, collectively referred to as the quarters 504. The quadrant 502A corresponds to a location on the media at which the pixel is to be printed, whereas the quarters 504 of the quadrant 502A correspond to the positions at or of this location at which fluid droplets can be ejected to realize the pixel.

The values of the quarters 504 within the quadrant 502A are interpreted in the same manner as has been described in relation to quarters 404 within the quadrant 402A of FIG. 4. Thus, in a first pass, fluid droplets are ejected at the quarters (i.e., positions) 504A and 504D, whereas in a second pass, a fluid droplet is ejected at the quarter 504B. No fluid droplet is ejected in either pass at the quarter 504C. The quadrants 502 of the printing mask 500 are utilized together utilized in the same way in which the quadrants 402 of the printing mask 400 of FIG. 4 are utilized. As such, it can be said that the printing mask 500 is a rolling print mask, in that the printing mask 500 specifies a different printing mask (i.e., a different quadrant) for each of a number of consecutive pixels that are all the same color (i.e., all are totally black) and are all part of the same area fill feature in question.

It is noted that the printing mask 500 is an inventive printing mask. In particular, the printing mask 500 inventively maximizes black optical density of area fill regions not by simply ejecting fluid droplets at each position of the location of each pixel of a given area fill region. Rather, the printing mask 500 inventively ejects fluid droplets over just three of the four positions of the location of each such pixel, over two passes. Thus, the printing mask 500 of FIG. 5 has been found to optimize area fill features in a two-pass print mode, where the media in question may have specific attributes or qualities that militate against ejecting fluid droplets at all four positions for each pixel.

Referring back to FIG. 1, once the printing mask has been selected for a pixel that is part of an area fill feature (114), additional area fill feature-related processing may be performed (116), as can be appreciated by those of ordinary skill within the art. For example, a percentage (i.e., a number) of pixels of the same color (i.e., that are also totally black) within the area fill feature in question may be depleted, or removed. Thereafter, however, the edges of the area fill feature that have had such pixels removed may be re-added so that these edges are maintained and do not have any pixels depleted therefrom. The pixel in question may further be fortified in one embodiment, but not all embodiments, by adding color to be printed at the location at which the pixel is to be printed prior to printing the black of the pixel. Such fortification further maximizes the black optical density of the pixel.

From either part 112, which is performed when the pixel is part of a line feature, or from parts 114 and 116, which are performed when the pixel is part of an area fill feature, the method 100 then applies the printing mask that has been selected to the pixel (118). In effect, such application of the mask to the pixel provides information as to the number of fluid droplets that are to be ejected to print the pixel, and the positions at which these fluid droplets are to be ejected to print the pixel. Such application of the mask to the pixel further may provide information as to the passes during which these fluid droplets are to be ejected to print the pixel.

The pixel of the image data is then printed or caused to be printed (120), using the printing mask that has been applied to the pixel. Thus, the fluid-ejection device prints or is caused to print a number of fluid droplets as specified by the printing mask, at the positions specified by the printing mask. Likewise, the fluid-ejection device prints or is caused to print the number of fluid droplets at these locations over passes that are also specified by the printing mask.

In the method 100, where the pixel in relation to which the method 100 is being performed is not a totally black pixel, then color-related processing is performed (122) prior to printing the pixel in part 120, as can be appreciated by those of ordinary skill within the art. For example, color linearization may be performed in relation to the pixel, by employing one or more color tables. Additionally or alternatively, as another example halftoning, which may also be referred to as error diffusion, may be employed in relation to the pixel. Other types of color-related processing may also be employed.

Figure 6:
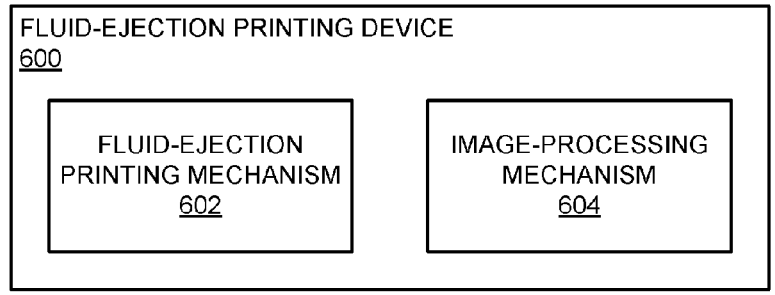
FIG. 6 is a block diagram of a rudimentary fluid-ejection printing device, according to an embodiment of the present disclosure.

In conclusion, FIG. 6 shows a block diagram of a rudimentary fluid-ejection printing device 600, according to an embodiment of the invention. The fluid-ejection printing device 600 may be a printer that has just printing functionality, a multi-function device (MFD) or an all-in-one (AIO) device that has printing functionality as well as other functionality like scanning and/or faxing functionality, or another type of fluid-ejection printing device. The fluid-ejection printing device 600 includes a fluid-ejection printing mechanism 602 and an image-processing mechanism 604. Those of ordinary skill within the art can appreciate that the device 600 may have other mechanisms and/or components, in addition to those depicted in FIG. 6.

The fluid-ejection printing mechanism 602 may be implemented in hardware or in a combination of hardware and software. The fluid-ejection printing mechanism 602 may be or include a scanning printhead. Such a printhead is moved one or more passes in relation to each swath of media to eject fluid droplets onto the swath in accordance with a corresponding swath of the image data in question. The media or the printhead is then advanced so that the printhead is incident to the next swath, and the printhead is moved one or more passes in relation to this next swath to again eject fluid droplets. This process is repeated until the printhead has ejected droplets of fluid onto the media in correspondence with the image data. The fluid-ejection printing mechanism 602 may in one embodiment be an inkjet-printing mechanism, such that the fluid-ejection printing device 600 is particularly an inkjet-printing device.

The image-processing mechanism 604 may be implemented in hardware, software, or a combination of hardware and software. The image-process mechanism 604 can perform the method 100 of FIG. 1 that has been described. Thus, within a single print mode, the image-processing mechanism determines whether each of a number of totally black pixels of the image data is part of a line feature of the image data or part of an area fill feature of the image data, and selects a corresponding printing mask that optimizes printing of line features or area fill features. As such, the fluid-ejection printing mechanism 602 prints these totally black pixels by employing the printing masks selected by the image-processing mechanism 604.

We claim:

1. A method comprising, for each pixel of a plurality of pixels of image data to be printed using a fluid-ejection printing device:

determining whether the pixel is a totally black pixel;

where the pixel is a totally black pixel, determining whether the pixel is part of a line feature of the image data or part of an area fill feature of the image data, where a line feature of the image data is defined as a plurality of contiguous pixels arranged along a length, the line feature having a same thickness at each of a plurality of points along the length, each pixel of the image data to either side of the line feature along the length not being a totally black pixel, and where an area fill feature of the image as defined as more than one contiguous pixel having the same color but that does not define a line;

where the pixel is part of a line feature of the image data, selecting a printing mask to use for printing the pixel as a first printing mask that is optimized for printing line features, the first printing mask specifying a number of fluid droplets to be printed for the pixel and positions where the fluid droplets are to be printed for the pixel;

where the pixel is part of an area fill feature of the image data, selecting the printing mask to use for the printing pixel as a second printing mask that is optimized for printing area fill features, the second printing mask specifying a number of fluid droplets to be printed for the pixel and positions where the fluid droplets are to be printed for the pixel;

applying the printing mask selected to the pixel of the image data; and, printing the pixel of the image data using the printing mask that has been applied, the fluid-ejection printing device printing the pixel by ejecting the number of fluid droplets specified by the printing mask at the positions specified by the printing mask.

2. The method of claim 1, wherein each of one or more of the first printing mask and the second printing mask further specifies which of the fluid droplets are to be printed for the pixel during each of a plurality of passes that the fluid-ejection printing device makes when printing the pixel in a bidirectional manner.

3. The method of claim 1, wherein each of one or more of the first printing mask and the second printing mask further corresponds to the pixel having a first size, where the fluid droplets that the fluid-ejection printing device ejects have a second size smaller than the first size.

4. The method of claim 1, wherein the first printing mask specifies a different printing mask for each of at least two consecutive pixels of the image data that are both totally black and both part of a same line feature of the image data.

5. The method of claim 1, wherein the second printing mask specifies a different printing mask for each of at least two consecutive pixels of the image data that are both totally black and both part of a same area fill feature of the image data.

6. The method of claim 1, wherein the first printing mask is optimized for printing line features at least in that the first printing mask compensates for one or more of:

a shape of fluid droplets ejected by the fluid-ejection printing device being non-perfectly spherical;

effects of bidirectional printing by the fluid-ejection printing device on the shape of the fluid droplets ejected by the fluid-ejection printing device; and, effects of a time differential between when the fluid droplets are ejected by the fluid-ejection printing device and when the fluid droplets impact media on the shape of the fluid droplets.

7. The method of claim 1, wherein the second printing mask is optimized for printing area fill features at least in that a black optical density of the area fill features as printed on media by the fluid-ejection printing device is maximized.

8. The method of claim 1, wherein determining whether the pixel is part of a line feature of the image data or part of an area fill feature of the image data comprises:

specifying a matrix of the image data, the matrix having a plurality of locations including a center location, the pixel being at the center location of the matrix;

where all the locations of the matrix of the image data have totally black pixels, concluding that the pixel is part of an area fill feature of the image data; and, where not all the locations of the matrix of the image data have totally black pixels, concluding that the pixel is part of a line feature of the image data.

9. The method of claim 1, further comprising:
receiving the pixel as having a red value, a green value, and a blue value; and,
converting the red value, the green value, the blue value of the pixel to a cyan value, a magenta value, a yellow value, and a black value of the pixel,
such that determining whether the pixel is a totally black pixel is performed using the cyan value, the magenta value, the yellow value, and the black value of the pixel.

10. The method of claim 1, further comprising, where the pixel is part of an area fill feature of the image, one or more of:
depleting a number of totally black pixels within the area fill feature of which the pixel is a part;
maintaining edges of the area fill feature of which the pixel is a part such that the edges do not have any pixels depleted therefrom; and,
fortifying the pixel with color to be printed under black when printing the pixel.

11. The method of claim 1, further comprising, where the pixel is not a totally black pixel, one or more of:
performing color linearization in relation to the pixel; and,
performing one or more of halftoning and error diffusion in relation to the pixel.

12. The method of claim 1, wherein the fluid-ejection printing device is an inkjet-printing device.

13. A fluid-ejection printing device comprising:
a fluid-ejection printing mechanism to eject droplets of fluid on media in correspondence with image data by employing printing masks for line features of the image data and area fill features of the image data; and,
an image-processing mechanism to determine within a single print mode whether each of a plurality of totally black pixels of the image data is part of a line feature of the image data or part of an area fill feature of the image data, where a line feature of the image data is defined as a plurality of contiguous pixels arranged along a length, the line feature having a same thickness at each of a plurality of points along the length, each pixel of the image data to either side of the line feature along the length not being a totally black pixel, and where an area fill feature of the image as defined as more than one contiguous pixel having the same color but that does not define a line,
such that a first printing mask is selected to use for printing the totally black pixels that are part of line features of the image data, the first printing mask optimized for printing line features, the first printing mask specifying a number of fluid droplets to be printed for a pixel that is part of a line feature and specifying positions where the fluid droplets are to be printed for the pixel, and
such that a second printing mask is selected to use for printing the totally black pixels that are part of area fill features of the image data, the second printing mask optimized for printing area fill features, the second printing mask specifying a number of fluid droplets to be printed for a pixel that is part of an area fill feature and specifying positions where the fluid droplets are to be printed for the pixel.

14. The fluid-ejection device of claim 13, wherein each of one or more of the first printing mask and the second printing mask further specifies which of the fluid droplets are to be printed for the pixel during each of a plurality of passes that the fluid-ejection printing device makes when printing the pixel in the single print mode that is a bidirectional print mode.

15. The fluid-ejection device of claim 13, wherein each of one or more of the first printing mask and the second printing mask further corresponds to the pixel having a first size, where the fluid droplets that the fluid-ejection printing device ejects have a second size smaller than the first size.

16. The fluid-ejection device of claim 13, wherein each of one or more the first printing mask and the second printing mask specifies a different printing mask for each of at least two consecutive pixels of the image data that are both totally black and both part of a same feature of the image data.

17. The fluid-ejection device of claim 13, wherein the first printing mask is optimized for printing line features at least in that the first printing mask compensates for one or more of:
a shape of fluid droplets ejected by the fluid-ejection printing device being non-perfectly spherical;
effects of bidirectional printing by the fluid-ejection printing device on the shape of the fluid droplets ejected by the fluid-ejection printing device; and,
effects of a time differential between when the fluid droplets are ejected by the fluid-ejection printing device and when the fluid droplets impact media on the shape of the fluid droplets.

18. The fluid-ejection device of claim 13, wherein the second printing mask is optimized for printing area fill features at least in that a black optical density of the area fill features as printed on media by the fluid-ejection printing device is maximized.

19. The fluid-ejection device of claim 13, wherein the fluid-ejection mechanism is an inkjet-printing mechanism, such that the fluid-ejection device is an inkjet-printing device.

20. A non-transitory computer-readable medium having one or more computer programs stored thereon to perform a method comprising, for each of a plurality of totally black pixels of image data to be printed using a fluid-ejection printing device:
determining whether the pixel is part of a line feature of the image data or part of an area fill feature of the image data, where a line feature of the image data is defined as a plurality of contiguous pixels arranged along a length, the line feature having a same thickness at each of a plurality of points along the length, each pixel of the image data to either side of the line feature along the length not being a totally black pixel, and where an area fill feature of the image as defined as more than one contiguous pixel having the same color but that does not define a line;
where the pixel is part of a line feature of the image data, selecting a printing mask to use for printing the pixel as a first printing mask that is optimized for printing line features, the first printing mask specifying a number of fluid droplets to be printed for the pixel and specifying positions where the fluid droplets are to be printed for the pixel;
where the pixel is part of an area fill feature of the image data, selecting the printing mask to use for the printing pixel as a second printing mask that is optimized for printing area fill features, the second printing mask specifying a number of fluid droplets to be printed for the pixel and specifying positions where the fluid droplets are to be printed for the pixel;
applying the printing mask selected to the pixel of the image data; and,
printing the pixel of the image data using the printing mask that has been applied to the pixel, the fluid-ejection printing device printing the pixel by ejecting the number of fluid droplets specified by the printing mask at the positions specified by the printing mask.

* * * * *